United States Patent [19]
Haskins

[11] 3,837,677
[45] Sept. 24, 1974

[54] STABILIZING TRAILER HITCH DOLLY

[76] Inventor: Robert William Haskins, 3050 Spring St., Orchard Lake, Mich. 48033

[22] Filed: Oct. 30, 1972

[21] Appl. No.: 302,216

[52] U.S. Cl. .............................. 280/476 R, 248/498
[51] Int. Cl. .............................................. B60d 7/00
[58] Field of Search...... 280/476 R, 460, 81 R, 496, 280/498

[56] References Cited
UNITED STATES PATENTS

| | | | |
|---|---|---|---|
| 2,506,718 | 5/1950 | Grant | 280/476 R |
| 2,570,482 | 10/1951 | Pruitt | 280/476 R |
| 2,622,891 | 12/1952 | Knapp | 280/476 R |

*Primary Examiner*—Robert R. Song

[57] ABSTRACT

This stabilizing trailer hitch dolly consists of a dolly frame having a pair of ground wheels on the opposite ends of a cross member carrying a trailer ball hitch. The frame has forwardly-extending laterally-spaced opposite side members perpendicular to the cross member terminating in wedge-shaped coupling members adapted to be pivotally connected to frame-mounted coupling adapters arranged to be secured permanently to the towing vehicle chassis near the rearward end thereof. The wedge-shaped coupling members provide limited rise and fall of the dolly relatively to the adapters on the towing vehicle, the vertical movement being cushioned by springs adjustably regulated by stop screws. Ground wheel axles carrying rotatable ground wheels are rigidly mounted on the down-turned opposite ends of the cross member.

10 Claims, 6 Drawing Figures

PATENTED SEP 24 1974 3,837,677

3,837,677

STABILIZING TRAILER HITCH DOLLY

SUMMARY OF THE INVENTION

The invention particularly resides in the pivotal coupling to the towing vehicle frame, with limited vertical swinging, of the forward ends of the trailer dolly frame side members on which the axles of the ground wheels are rigidly mounted. The invention effectively minimizes any side sway of the trailer and of the rear end of the towing vehicle by, in effect, locking the rear end of the towing vehicle to the road.

Figure 1:
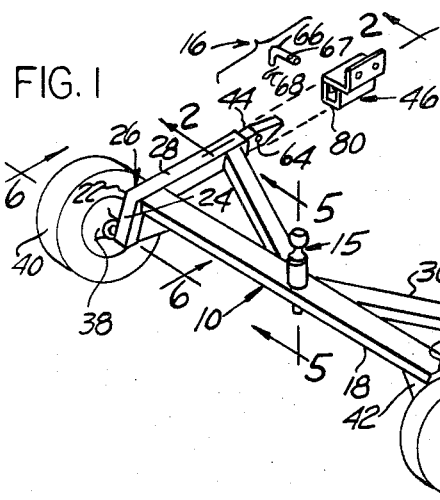
FIG. 1 is a perspective view, on a reduced scale, of a stabilizing trailer hitch dolly, according to one form of the invention, with the adapters and the pivot pins of the towing vehicle chassis shown in exploded perspective.

Referring to the drawing in detail, FIG. 1 shows a stabilizing trailer hitch dolly, generally designated 10, according to one form of the invention, as including a dolly frame 12 supported for travel on rotatable ground wheels 14 carrying a ball trailer hitch 15 and pivotally connected to the towing vehicle (not shown) by a pivotal dolly coupling device, generally designated 16, at the forward ends on opposite sides of the frame 12. The dolly frame 12 consists of a cross member 18 having its opposite ends 20 welded or otherwise connected to the locations or corners 22 between the downturned end portions 24 of longitudinal frame side members 26 having forwardly-extending portions 28 (FIG. 1).

Figure 6:
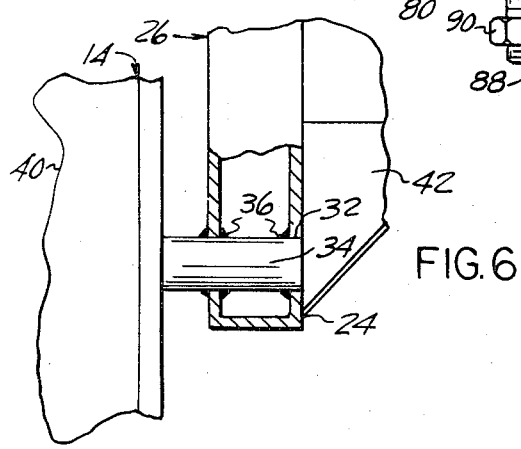
FIG. 6 is an enlarged fragmentary vertical section through the lower end of one of the dolly frame side members, axle and ground wheel, taken along the line 6—6 in FIG. 1.

The frame cross member 18 and the frame side members 26 are preferably of square cross-section steel tubing optionally reinforced by diagonal members 30 welded at their forward ends to the forward portions 28 of the side members 26 and at their rearward ends to the approximate midportion of the cross member 18. The downturned end portions 24 of the longitudinal side frame members 26 are drilled as at 32 (FIG. 6) to receive axles 34 rigidly mounted therein and welded thereto as at 36. Rotatably mounted on the axles 34 at the outer ends thereof are the hubs 38 of the ground wheels 14 having pneumatic tires 40 thereon. Triangular vertical bracing plates 42 are welded or otherwise secured between the downturned end portions 24 and the lower side of the cross beam 18.

Each pivotal coupling device 16 consists generally of a wedge-shaped rocking member 44 which fits into the recess 45 of a flanged square cross-section tubular dolly-coupling adapter 46, and an L-shaped pivot pin 48 pivotally interconnecting the members 44 and 46 (FIGS. 1 to 4 inclusive). The rocking member 44 has a square cross-section rearward portion 50 welded or otherwise secured at 52 inside the forward end 54 of the respective forwardly-extending portion 28 of the longitudinal frame side member 26, and a wedge-shaped forward portion 56 extending forward from its junction 58 with the rearward portion 50. The wedge-shaped portion 56 has upper and lower surfaces 60 and 62 respectively. The rocking member 44 is bored horizontally at 64 to receive the shank 66 of the L-shaped pivot pin 48 (FIG. 1) drilled transversely at 67 to receive a cotter pin 68. The pivot pin 48, before and after passing through the bore 64, also passes through aligned holes 70 in the opposite side walls 72 of the box-shaped tubular adapter 46, the upper wall 74 of which has an upstanding flange 76 provided with a pair of bolt holes 78 by which it is secured to the rearward portions of the towing vehicle frame. Each of the adapters 46 has a bottom wall 80.

Figure 2:
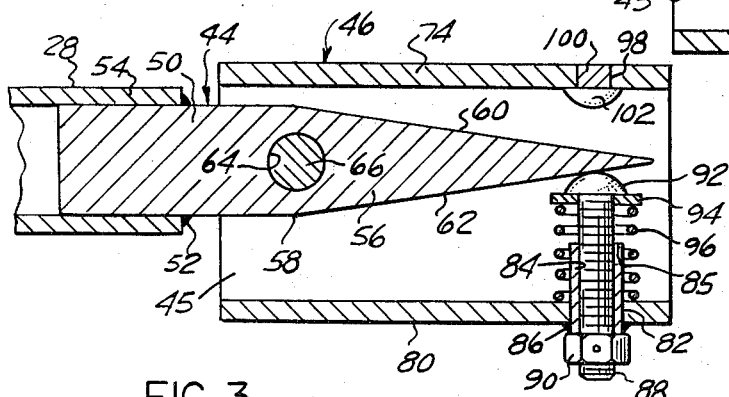
FIG. 2 is an enlarged vertical section, taken along the line 2—2 in FIG. 1, with one of the wedge-shaped pivoted coupling members shown in its median position during travel.
Figure 3:
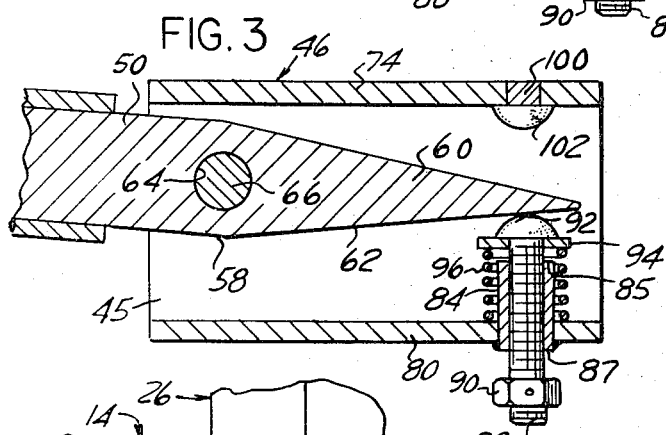
FIG. 3 is a view similar to FIG. 2, but with the same wedge-shaped coupling member shown near its cushioned lowermost position during travel, thereby limiting and cushioning the upward travel of the dolly.

The lower wall 80 is drilled at 82 to receive a sleeve 84 (FIG. 2) having an upper end 85, the lower end 87 of which is welded or otherwise secured thereto as at 86 and which slidably receives a bolt 88. The bolt 88 is provided at its lower end with a spring tension adjusting nut 90 threaded thereon, the rounded head 92 of which is urged upward by a washer 94 and the upper end of a compression spring 96 encircling the sleeve 84. The lower end of the spring 96 engages the inner side of the bottom wall 80. Spaced vertically away from the sleeve 84 and coaxial therewith is a hole 98 in which is seated the shank of a round-headed stud 100 of rivet shape similar to the head 92 of the bolt 88. As a consequence, the wedge-shaped portions 56 of the male members 44 and with them the frame side members 26 of the dolly 10, are adapted to swing vertically around the pivot pins 66 within the limited range provided by the bolt head 92 against the upper end 85 of the sleeve 84 and the stud head 102 acting as stops. FIG. 2 shows the median position of swing. FIG. 3 a position near the lowermost position, compressing the spring 96, and FIG. 4 the uppermost position against the stud head 102.

Figure 5:
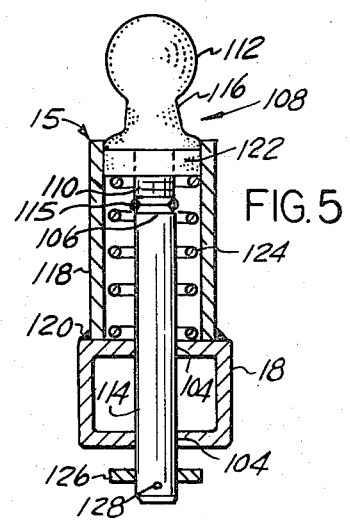
FIG. 5 is an enalrged central vertical section through the trailer hitch device, taken along the line 5—5 in FIG. 1.

The cross member 18 of the dolly frame 12 is bored vertically with aligned holes 104 at its midportion (FIGS. 1 and 5) to slidably receive the shank 106 of the ball-headed plunger 108 of the trailer hitch 15 mounted thereon. The shank 106 has a threaded portion 110 terminating in a flanged ball head 112 with a neck 116 below it. The shank 106 has an unthreaded portion 114 welded end-to-end to the threaded portion 110 at 115. The plunger 108 is encircled by a sleeve 118 welded or otherwise secured at 120 at its lower end to the cross beam 18. Threaded upon the threaded portion 110 of the shank 106 is an annular adjusting nut 122 which serves as the adjustable upper abutment of a helical compression spring 124. The spring 124 encircles the shank 106 within the sleeve 118, and its lower end abuts the upper side of the cross beam 18. Mounted on the lower end of the unthreaded shank portion 114 below the cross beam 18 is a stop washer 126. The lower end of the unthreaded shank portion 114 is drilled diametrically to receive a retaining cotter pin 128 or the like for the stop washer 126.

Prior to the operation of the stabilizing trailer dolly 10, the square-cross-section tubular dolly-coupling adapters 46 are positioned at a suitable location near the rearward end of the towing vehicle frame (not shown) and the bolt holes 78 drilled through the flanges 76 thereof and through the vehicle frame side members. Bolts (not shown) are then inserted through these aligned bolt holes 78 and nuts (not shown) tightened thereon to firmly and rigidly secure the boxes 46 of the towing vehicle frame side members (not shown). It is of course understood that the adapters 46 will be so mounted as to be spaced laterally apart from one another and at the same heights as the wedge-shaped rocking members 44. The trailer-coupling dolly 10 is then moved forward with its wedge-shaped rocking members 44 aligned with the adapters 46 until their bores 64 align with the adapter holes 70. The installer then pushes the shanks 66 of the pivot pins 48 through the thus-aligned holes 70 and 64 and inserts the cotter pins 68 in the holes 67 thereof, thereby pivotally connecting the trailer dolly 10 to the towing vehicle by way of the pivot pins 66 and adapters 46.

Figure 4:
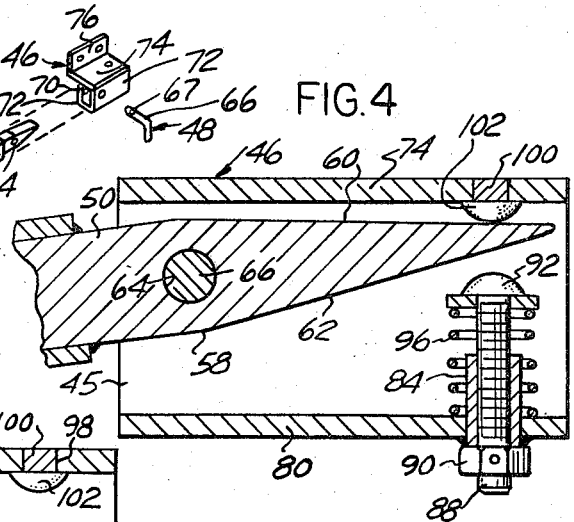
FIG. 4 is a view similar to FIGS. 2 and 3, but with the same wedge-shaped coupling member, shown in its uppermost position during travel, thereby limiting the downward travel of the dolly.

In the operation of the trailer dolly 10, the user superimposes the hitch socket of the coupling tongue (not shown) of the trailer upon the hitch ball 112 of the trailer coupling device 15 in the usual manner and closes the conventional locking lever or levers upon the neck 116 below the head 112. The operator then operates the towing vehicle in the usual manner to tow the trailer through the intermediate connection thereto provided by the trailer dolly 10. As the trailer dolly wheels 14 go over bumps or depressions in the roadway, they rise and fall freely by the pivotal connection provided by the pivot pins 48 for the wedge-shaped members 44. Moreover, the upward swinging of the members 44 is limited by the rounded heads 102 of the studs 100 and the downward swinging thereof caused by the upward movement of the wheels 14 and the dolly frame 12 is cushioned by the coil springs 96 depressed by the bolts 88 acting as spring-loaded plungers, and limited by the upper ends 85 of the sleeves 84. The force of the springs 96 is conveniently adjusted by rotating the nuts 90. The upward limit of swing is shown in FIG. 4, the median position in FIG. 2, and the downward position nearing the stop ends 85 in FIG. 3.

As travel proceeds and the towing vehicle rounds a curve, the coupling dolly 10 slides sideways without causing a corresponding sliding of the trailer. During normal travel, the dolly 10 minimizes any side sway of the trailer. Thus the dolly 10, in effect, locks the back end of the towing vehicle to the road and at the same time the limited pivoting action of the upward and downward movement of the dolly 10 prevents so-called "nose diving" when the towing vehicle is braked to a stop. The pivotal connection by the pivot pins 66 prevents the dolly 10 and its wheels from jumping off the ground and, aided by the cushioning springs 96, also greatly reduces the transmission of road shocks, which a rigid connection was found to do. Thus the trailer coupling dolly 10 stabilizes the travel of both the trailer and the towing vehicle.

I claim:

1. A stabilizing trailer hitch dolly for connecting the chassis of a towing vehicle to a trailer with a first trailer hitch component thereon, said dolly comprising
   a coupling adapter structure having means thereon for securing said adapter structure to the chassis of the towing vehicle rearwardly thereof,
   a dolly frame having a second trailer hitch component thereon adapted to cooperably engage the first trailer hitch component in separable hitching relationship,
   said dolly frame having a cross member thereon and a draft structure extending longitudinally forward from said cross member into coupling engagement with said adapter structure,
   horizontal pivot means pivotally interconnecting said structures and restricting said draft structure to up-and-down relative swinging motion solely around a horizontal pivot axis therebetween while restraining said dolly frame from swinging laterally relatively to the chassis frame of the towing vehicle,
   axle means mounted on said frame adjacent said cross member,
   ground wheels mounted on said axle means in laterally-spaced relationship for rotation relatively to said frame,
   and means for also restraining said ground wheels from swinging laterally relatively to said dolly frame.

2. A stabilizing trailer hitch dolly, according to claim 1, wherein stop means on said coupling adapter structure are disposed in up-and-down swing-limiting relationship with said draft structure.

3. A stabilizing trailer hitch dolly for connecting the chassis of a towing vehicle to a trailer with a first trailer hitch component thereon, said dolly comprising
   a coupling adapter structure having means thereon for securing said adapter structure to the chassis of the towing vehicle rearwardly thereof,
   a dolly frame having a second trailer hitch component thereon adapted to cooperably engage the first trailer hitch component in separable hitching relationship,
   said dolly frame having a cross member thereon and a draft structure extending longitudinally forward from said cross member into coupling engagement with said adapter structure,
   horizontal pivot means pivotally interconnecting said structures and restricting said draft structure to up-and-down relative swinging motion solely around a horizontal pivot axis therebetween while restraining said dolly frame from swinging laterally relatively to the chassis frame of the towing vehicle,
   axle means mounted on said frame adjacent said cross member,
   ground wheels mounted on said axle means in laterally-spaced relationship for rotation relatively to said frame,
   and means for restraining said ground wheels from swinging relatively to said frame around a vertical pivot axis,
   one of said structures having a recess therein and the other structure having a projection extending into said recess,
   said horizontal pivot means comprising a horizontal pivot element extending horizontally through said projection and across said recess into said one structure.

4. A stabilizing trailer hitch dolly for connecting the chassis of a towing vehicle to a trailer with a first trailer hitch component thereon, said dolly comprising a coupling adapter structure having means thereon for securing said adapter structure to the chassis of the towing vehicle rearwardly thereof, a dolly frame having a second trailer hitch component thereon adapted to cooperably engage the first trailer hitch component in separable hitching relationship, said dolly frame having a cross member thereon and a draft structure extending longitudinally forward from said cross member into coupling engagement with said adapter structure, horizontal pivot means pivotally interconnecting said structures and restricting said draft structure to up-and-down relative swinging motion solely around a horizontal pivot axis therebetween while restraining said dolly frame from swinging laterally relatively to the chassis frame of the towing vehicle, axle means mounted on said frame adjacent said cross member, ground wheels mounted on said axle means in laterally-spaced relationship for rotation relatively to said frame, and means for restraining said ground wheels from swinging relatively to said frame around a vertical pivot axis, one of said structures having a wedge-shaped projection thereon and the other structure having stop portions thereon disposed in up-and-down swing-limiting relationship with said projection.

5. A stabilizing trailer hitch dolly, according to claim 4, wherein said draft structure has said wedge-shaped projection thereon and wherein said adapter structure has said stop portions thereon.

6. A stabilizing trailer hitch dolly for connecting the chassis of a towing vehicle to a trailer with a first trailer hitch component thereon, said dolly comprising a coupling adapter structure having means thereon for securing said adapter structure to the chassis of the towing vehicle rearwardly thereof, a dolly frame having a second trailer hitch component thereon adapted to cooperably engage the first trailer hitch component in separable hitching relationship, said dolly frame having a cross member thereon and a draft structure extending longitudinally forward from said cross member into coupling engagement with said adapter structure, horizontal pivot means pivotally interconnecting said structures and restricting said draft structure to up-and-down relative swinging motion solely around a horizontal pivot axis therebetween while restraining said dolly frame from swinging laterally relatively to the chassis frame of the towing vehicle, axle means mounted on said frame adjacent said cross member, ground wheels mounted on said axle means in laterally-spaced relationship for rotation relatively to said frame, and means for restraining said ground wheels from swinging relatively to said frame around a vertical pivot axis, said structures being disposed in up-and-down swing-limiting relationship with the other structure, said stop means including an upper stop and a lower stop disposed in vertically-spaced relationship above and below the upper and lower sides of said other structure.

7. A stabilizing trailer hitch dolly for connecting the chassis of a towing vehicle to a trailer with a first trailer hitch component thereon, said dolly comprising a coupling adapter structure having means thereon for securing said adapter structure to the chassis of the towing vehicle rearwardly thereof, a dolly frame having a second trailer hitch component thereon adapted to cooperably engage the first trailer hitch component in separable hitching relationship, said dolly frame having a cross member thereon and a draft structure extending longitudinally forward from said cross member into coupling engagement with said adapter structure, pivot means pivotally interconnecting said structure for up-and-down relative swinging motion therebetween, axle means mounted on said frame adjacent said cross member, ground wheels mounted on said axle means in laterally-spaced relationship for rotation relatively to said frame, stop means on one of said structures disposed in swing-limiting relationship with the other structure, said stop means including an upper stop and a lower stop disposed in vertically-spaced relationship above and below the upper and lower sides of said other structure, and resilient cushioning means disposed adjacent one of said stops in shock-cushioning relationship therewith.

8. A stabilizing trailer hitch dolly, according to claim 7, wherein said cushioning means comprises a spring disposed adjacent said lower stop.

9. A stabilizing trailer hitch dolly, according to claim 7, wherein said cushioning means has a resilient-means adjusting element adjustably connected thereto.

10. A stabilizing trailer hitch dolly, according to claim 9, wherein said one stop has a movable member with a threaded portion thereon, wherein a cushioning spring is disposed between said movable member and said adapter structure, and wherein said adjusting element comprises an adjusting nut threadedly engaging said threaded portion.

* * * * *